United States Patent
Usman (10) Patent No.: US 9,978,121 B2
(45) Date of Patent: May 22, 2018

(54) ADAPTIVE SHARPENING IN IMAGE PROCESSING AND DISPLAY

(71) Applicant: Razzor Technologies Inc., Irvine, CA (US)

(72) Inventor: Mohammad Usman, Mission Viejo, CA (US)

(73) Assignee: Razzor Technologies, Irvine, CA (US)

( * ) Notice: Subject to any disclaimer, the term of this patent is extended or adjusted under 35 U.S.C. 154(b) by 31 days.

(21) Appl. No.: 15/025,271

(22) PCT Filed: Dec. 3, 2014

(86) PCT No.: PCT/US2014/068388
§ 371 (c)(1),
(2) Date: Mar. 26, 2016

(87) PCT Pub. No.: WO2015/084966
PCT Pub. Date: Jun. 11, 2015

(65) Prior Publication Data
US 2016/0239942 A1   Aug. 18, 2016

Related U.S. Application Data

(60) Provisional application No. 61/912,006, filed on Dec. 4, 2013.

(51) Int. Cl.
*G06T 17/00* (2006.01)
*G06T 3/40* (2006.01)
(Continued)

(52) U.S. Cl.
CPC .................. *G06T 3/40* (2013.01); *G06T 5/00* (2013.01); *G06T 7/13* (2017.01); *G06T 7/60* (2013.01);
(Continued)

(58) Field of Classification Search
CPC .............................. G06T 17/20; G06T 15/00
(Continued)

(56) References Cited

U.S. PATENT DOCUMENTS

2004/0075755 A1\* 4/2004 Rantanen .............. G06T 11/001
348/231.99
2007/0083114 A1\* 4/2007 Yang ........................ A61B 8/00
600/437

(Continued)

OTHER PUBLICATIONS

Kurt, et al. "Medical Images Enhancement by using Anisotropic Filter and CLAHE"; 1-26 Innovations in Intelligent Systems and Applications International Symposium; Publication [online]. Jul. 2012 [retrieved Feb. 10, 2015]. Retrieved from the Internet: <URL: hltp:/lieeexplore.ieee.org/xpl/articleDetails.jsp?arnumber= 6246971 >; pp. 1-4.
Notice of Allowance for U.S. Appl. No. 15/025,270, dated Feb. 27, 2017.

*Primary Examiner* — Jin Ge
(74) *Attorney, Agent, or Firm* — Thomas J. Lavan (57) ABSTRACT

A method for sharpening of an image. The method combines edge sharpening and noise reduction on image and video data to eliminated artifacts, thereby creating natural looking output images and video without increased noise. The algorithm uses one dimensional look-up tables not requiring complex spatial frequency processing of input image and video data. The look-up tables reduce differences for small input differences which are likely noise, increase differences for mid-level input differences to increase edge slope and sharpness, and maintain high-level input differences to maintain sharp edges without noise increase on those edges that are already sharp. A device for sharpening an image is also disclosed, comprising of a processor in communication with a non-transitory computer readable medium storing the sharpening algorithm communicable to and executable by the processor.

21 Claims, 3 Drawing Sheets

(51) Int. Cl.
*H04N 19/80* (2014.01)
*H04N 19/86* (2014.01)
*G06T 5/00* (2006.01)
*G06T 7/60* (2017.01)
*G06T 7/13* (2017.01)
*G06T 7/90* (2017.01)
*H04N 19/20* (2014.01)

(52) U.S. Cl.
CPC ............... *G06T 7/90* (2017.01); *H04N 19/80* (2014.11); *H04N 19/86* (2014.11); *H04N 19/20* (2014.11)

(58) Field of Classification Search
USPC .......................................................... 345/428
See application file for complete search history.

(56) References Cited

U.S. PATENT DOCUMENTS

| | | | |
|---|---|---|---|
| 2010/0134496 A1* | 6/2010 | Bhaskaran | G06T 5/002 345/428 |
| 2011/0090370 A1* | 4/2011 | Cote | H04N 5/208 348/237 |
| 2012/0263366 A1 | 10/2012 | Huo et al. | |
| 2013/0147797 A1* | 6/2013 | Tanaka | H04N 13/026 345/419 |
| 2014/0009469 A1* | 1/2014 | Shin | G06T 5/003 345/428 |
| 2014/0210816 A1* | 7/2014 | Zimmermann | G06T 19/20 345/420 |

* cited by examiner

FIG. 5A Unprocessed Edge

FIG. 5B Undershoot and Overshoot Processed Edge

FIG. 5C Present Invention Processed Edge

Relative Intensity

ADAPTIVE SHARPENING IN IMAGE PROCESSING AND DISPLAY

CROSS-REFERENCE TO RELATED PATENT APPLICATION

This application is a continuation of International Application No. PCT/US14/68388, filed Dec. 3, 2014, which claims the benefit of U.S. Provisional Application No. 61/912,006 filed Dec. 4, 2013, the disclosure of which is incorporated herein by reference.

BACKGROUND

Technical Field

Color image processing and display, and in particular, rendering of color images that are perceived to be of high aesthetic quality.

Description of Related Art

Current techniques for the rendering of high quality color images include techniques for the sharpening of images. Sharpening of an image is needed when the image has some level of blur. The blur may be caused by camera optics, and/or the image receptor in a digital camera, and/or the lack of steadiness of the camera when the image was acquired. At some level, image blur will be sufficiently high so as to cause a human observer of the image to perceive the image to be of low quality. Additionally, sharpening may be needed because blur in an image prevents a human observer or a computer algorithm from obtaining information from the image that would otherwise be perceivable or available if the image were sufficiently sharp.

Image and video processing to increase edge sharpness and reduce noise has been used to improve perceived quality since the inception of digital imaging due to the general implementation advantages of processing digital pixels in software or digital hardware over processing analog image and video data with complex analog electronics. Current image processing methods are directed to separate sharpening and noise reduction, with noise reduction most typically occurring before sharpening in order to reduce the visibility of sharpened image and video noise.

Figure 5A:
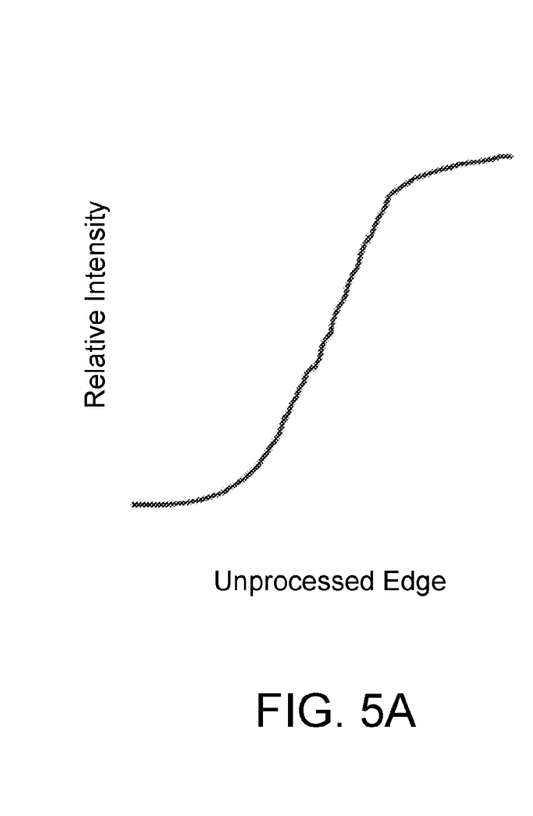
FIGS. 5A-5C depict a blurred edge in an unprocessed image, the blurred edge of the unprocessed image sharpened according to a prior art method and algorithm, and the blurred edge of the unprocessed image sharpened according to a method and algorithm of the present invention, respectively.
Figure 5B:
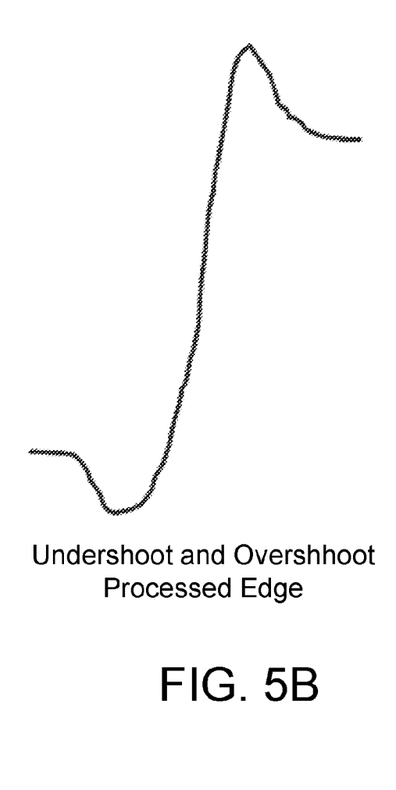
Figure 5C:
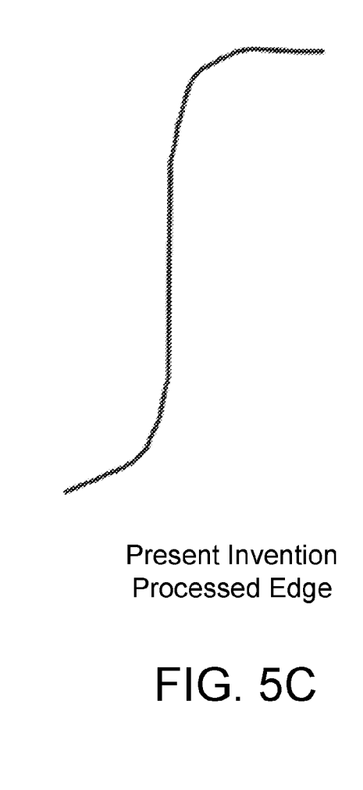

Current algorithms for image sharpening include the "unsharp mask" (UM), digital enhancement filters, and edge based sharpening. Although these algorithms function to sharpen an image, because they preserve local mean values of input still images or video image sequences, they produce unnatural edge transitions. By way of illustration, FIGS. 5A-5C depict a blurred edge in an unprocessed image, the blurred edge sharpened according to a prior art sharpening algorithm, and the blurred edge sharpened according to a method and algorithm of the present invention respectively. It can be seen that the edge of FIG. 5B processed with the prior art algorithm has a "dip" on the low value side of and edge and a "peak" on the high value side of the edge, also called undershoot and overshoot. These are seen as unnatural to viewers and often referred to as glows around edges because they do not represent the type of edge transition from better optics that viewers are familiar with visually. Such glows are perceived negatively by viewers as artifacts in the output images. In contrast, the edge of FIG. 5C has been processed with an algorithm and method of the present invention, as will be described subsequently herein. It can be seen that the edge is narrower, i.e., it has been sharpened, while also not having any overshoot or undershoot.

Current algorithms such as the unsharp mask also have the undesirable effect of enhancing image noise. Images having enhanced noise have poor aesthetics, i.e., they are perceived by observers to be "unpleasant to look at." There are variations of the unsharp mask algorithm, such as weighted UM, but these operate such that the weights are dependent upon local pixel mean or edge intensity. Each of these variations of the UM algorithm has its own disadvantages and results in overshoot of edges or other artifacts.

Additionally, certain currently practiced algorithms and methods have been complex to implement. They may include spatial frequency decomposition of image or video data, with high frequency data treated as noise, and reduced and low frequency data treated as edges, Hence, these methods are not suitable for real time high resolution video image processing. Instead, their use is limited to still image processing.

Examples of noise reduction in currently practiced and algorithms include, but are not limited to, median filtering, statistical estimation, epilson non-linear gradient filters, and digital smoothing filers. These methods have been shown to be effective for reducing image and video noise but they also reduce edge sharpness, resulting in a need to have a combined method that sharpens edges and reduces noise that can be implemented in real time for high resolution video data.

In an attempt to address this need, color transformations have been used to calculate the image or video pixel intensity for the sharpening and noise reduction processing to avoid changing color pixel data. These methods used well known color transformations to convert input RGB image or video data to Cie L*a*b* and Cie Luv with L being intensity, or HSV with H being intensity, or processed input RGB data directly with transformation that isolated the G luminance data. Since changing L*, L, H or G also changes color hue and saturation, however, these methods cause color shifts along edges and in noise areas, both of which are perceived negatively by viewers as unnatural artifacts.

Furthermore, it is noted that most of the currently practiced algorithms are not suitable for software implementation as they require computation of mean or standard deviation around the "pixel of interest." Current digital cameras have high resolution CCD sensors that have a very large number of pixels; even in cell phones, cameras having 8 megapixel CCDs are now common. With the pixel count of common digital images now being so high, a software implementation of current image sharpening algorithms is computationally prohibitive, especially using the processor in a cell phone, and with the desire by a user to perform image sharpening in a matter of seconds.

Thus there remains a need for an image sharpening method that can sharpen a color image without enhancing noise in the image, and that is not computationally intensive such that it can be executed on a processor of modest capability and achieve the sharpening in an acceptably short time, and in particular, at a short enough time to enable real time sharpening of images at video of movie sequence rates. Additionally, there is a need for an image sharpening algorithm and method that is able to suppress noise in an image. Additionally, there is a need for an image sharpening algorithm and method that does not cause color shifts along edges and in noise areas.

SUMMARY

The present invention meets at least one of these needs by providing a method for sharpening of an image. The image may be a grey scale image or a color image. In one aspect of the invention, an algorithm for performing image sharpening combines edge sharpening and noise reduction on image and video data to eliminated artifacts, thereby creating natural looking output images and video without increased noise. The algorithm is simple to implement, using one dimensional look-up tables (1D LUTs) that do not require complex spatial frequency processing of input image and video data. The 1D LUTs reduce differences for small input differences which are likely noise, increase differences for mid-level input differences to increase edge slope and sharpness, and maintain high-level input differences to maintain sharp edges without noise increase on those edges that are already sharp.

In another aspect of the invention, an algorithm for performing image sharpening uses a two dimensional mask that differentiates between "noise pixels," which are intended to not be sharpened, and "edge pixels," i.e. pixels located along the edge of an object in the image, which are intended to be sharpened. In one embodiment, the two dimensional mask may be a 3×3 mask. Other sizes of two dimensional masks are contemplated. In another aspect of the invention, the algorithm is a generalization of an unsharp mask and an ç-filter. The strength of the ç-filter may be determined by look-up tables (LUT).

In another aspect of the invention, an algorithm for performing image sharpening implements the sharpness and noise reduction processing on image and video brightness data, using the I data from a Cie IPT transformation of input RGB image or video data to produce output image or video data that does not include color changes that are produced when processing Cie L*a*b*, Cie LUV or RGB image or video data. Processing the I values preserves the color values on edges and therefore does not produce unnatural color artifacts.

In summary, when sharpening an image according to the algorithms and methods of the present invention, image noise is suppressed, low intensity edges of objects in the image are enhanced, and objects in the image that are already sharp are left unchanged.

More specifically, in accordance with the present invention, a method of sharpening an input image to produce an output image is provided. The method comprises providing the input image as a digital input image comprised of input image pixels, each input image pixel defined by input image pixel data; identifying center pixels of the digital input image, the center pixels defined as those image pixels that are surrounded by upper and lower vertical pixels, left and right horizontal pixels, and upper left, upper right, lower left, and lower right diagonal pixels; for each of the center pixels, calculating at least four input gradients of intensity relative to the center pixel; defining a gradient minimum value, and a gradient maximum value; applying a gradient gain function to each of the input gradients of intensity for each of the center pixels to produce respective output gradients of intensity for each of the center pixels, wherein the gradient gain function is defined to adaptively vary the amount of gain such that object edges in the input image that are perceived by a human observer to be of low intensity are enhanced, and object edges in the input image that are perceived by a human observer to be sharp are left substantially unchanged; for each of the center pixels, calculating output image pixel data based upon their output gradients of intensity, the output image pixel data defining output image pixels of the output image; and communicating the output image pixel data to an image data receiver.

In certain embodiments, calculating the at least four input gradients of intensity relative to the center pixel may be comprised of calculating respective input gradients of intensity from the center pixel to the left horizontal pixel, from the center pixel to the right horizontal pixel, from the center pixel to the upper vertical pixel, and from the center pixel to the lower vertical pixel. In other embodiments, calculating the at least four input gradients of intensity relative to the center pixel may be comprised of calculating respective input gradients of intensity from the upper vertical pixel to the lower vertical pixel, from the left horizontal pixel to the right horizontal pixel, from the upper left diagonal pixel to the lower right diagonal pixel, and from the lower left diagonal pixel to the upper right diagonal pixel. In other embodiments, calculating the at least four input gradients of intensity relative to the center pixel may be comprised of calculating respective input gradients of intensity from the center pixel to the left horizontal pixel, from the center pixel to the right horizontal pixel, from the center pixel to the upper vertical pixel, from the center pixel to the lower vertical pixel, from the center pixel to the upper left diagonal pixel, from the center pixel to the lower left diagonal pixel, from the center pixel to the upper right diagonal pixel, from the center pixel to the lower right diagonal pixel.

The gradient gain function may be a linearly increasing function over a low range of gradients, a constant over an intermediate range of gradients, and a linearly decreasing function over a high range of gradients. Such a the gradient gain function may include a region of negative gain over a second low range of gradients that is less than the first low range of gradients. In one embodiment, the gradient gain function may be a quantized Rayleigh distribution.

The gradient gain function may be defined using a one-dimensional look-up table containing a gain value corresponding to each gradient value. Alternatively or additionally, the gradient gain function may be defined by the combination of an unsharp mask and a noise suppression filter. The gradient gain function may be further defined to adaptively suppress noise in regions of the input image that are perceived by a human observer to be smooth regions. In certain embodiments, the unsharp mask operates to increase the intensity of edges of objects in the input image that are of low intensity, and the noise suppression filter operates to decrease the intensity of pixel values around the center pixel that are greater than a predetermined threshold amplitude value.

The input image to be sharpened may be a greyscale or other monotone image, or a color image comprised of input image pixels defined by color tristimulus values. Such color tristimulus values may be RGB tristimulus values, in which case the method may further comprise performing a color transformation to a color space having an image intensity component. The color transformation may be to a color space selected from CieL*a*b*, CieLuv, CieIPT, and HSV.

The method of sharpening an image may be applied to a plurality of input images defining a video, to produce a plurality of output images defining a sharpened video. In certain embodiments, the image data receiver may be a display device, in which case the method further comprises displaying the image on the display device.

In accordance with the present invention, a device for sharpening an image is also provided. The device is comprised of a processor in communication with a non-transitory computer readable medium storing an algorithm communicable to and executable by the processor. The algorithm includes the steps of sharpening an input image as described above and subsequently herein. The device may include an image data receiver, which, in certain embodiments, may be an image display. Alternatively, the image data receiver may be a non-transitory computer readable medium, such as a memory, or a data storage disc, either of which may be portable. The device may further include a data input port in communication with a source of the digital input image and in communication with the processor.

BRIEF DESCRIPTION OF THE DRAWINGS

The present disclosure will be provided with reference to the following drawings, in which like numerals refer to like elements, and in which.

The present invention will be described in connection with certain preferred embodiments. However, it is to be understood that there is no intent to limit the invention to the embodiments described. On the contrary, the intent is to cover all alternatives, modifications, and equivalents as may be included within the spirit and scope of the invention as defined by the appended claims.

DETAILED DESCRIPTION

For a general understanding of the present invention, reference is made to the drawings. In the drawings, like reference numerals have been used throughout to designate identical elements. Additionally, as used herein, a "non-transitory computer readable medium" is meant to include all computer readable media, including but not limited to hard disks, compact disks, digital video disks, flash memory, random access memory, read-only memory, cache memory, and register memory; and to not include a transitory propagating signal As noted above in the SUMMARY, an algorithm in accordance with the present disclosure is a generalization of an unsharp mask and an ç-filter. Further details on the unsharp mask, and on the ç-filter will now be presented.

Unsharp Mask

The unsharp mask (UM) is a known method for image sharpening. It may be practiced according to the following equation:

$$p^{out} = p_0 + \lambda \cdot h(P), \qquad (1)$$

where $p^{out}$ is the output pixel intensity or the resultant intensity, $p_0$ is the "pixel of interest" (also referred to herein as the input pixel or the "center pixel"), $P=\{p_0, p_1, \ldots p_8\}$ is the 3×3 input pixel window vector, $h(P)$ is a high pass version of an input image to be sharpened, and $\lambda$ is a sharpening strength parameter. It is noted that $\lambda$ is a constant, and therefore does not vary with the strength of an edge.

Figure 1:
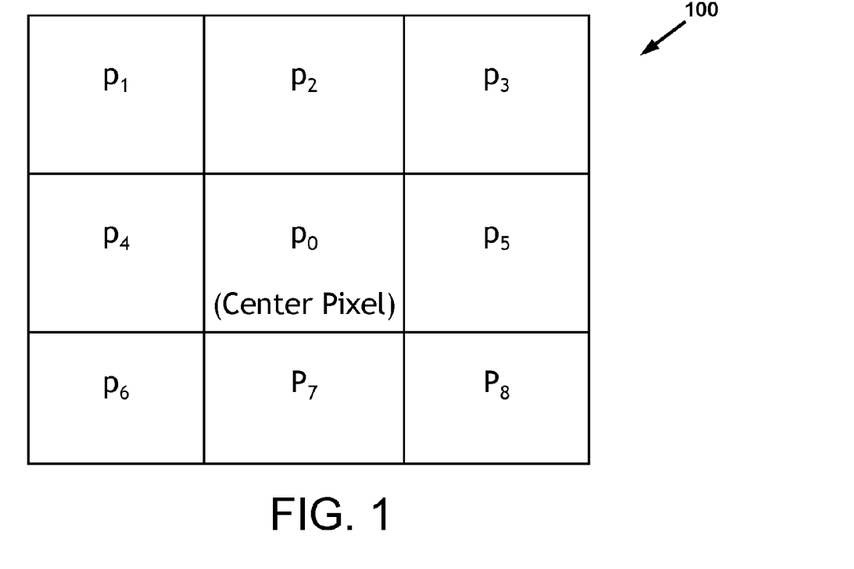
FIG. 1 is a 3×3 matrix that may be used in an unsharp mask algorithm for sharpening images.
Figure 2:
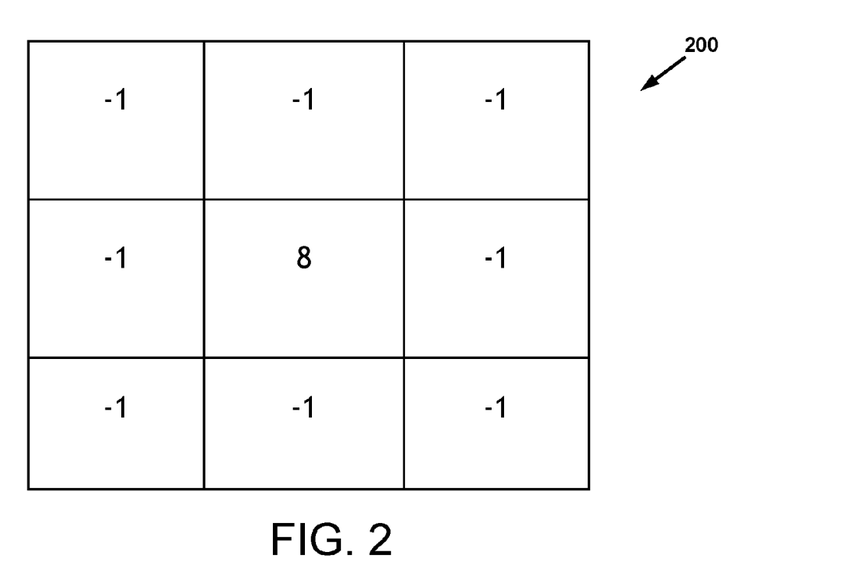
FIG. 2 is an exemplary Laplacian matrix that may be used as a high pass filter in executing an unsharp mask algorithm for sharpening images.

In applying the unsharp mask algorithm, one may use a 3×3 mask, also referred to herein as a window 100, as shown in FIG. 1. Additionally, one common high pass filter that may be used is a 4 or 8 neighbor Laplacian matrix. An exemplary filter or mask 200 is shown in FIG. 2.

Thus Equation (1) can be rewritten as follows:

$$p^{out} = p_0 - \lambda \cdot \nabla^2(P), \qquad (2)$$

$$= p_0 + \lambda \cdot \left[\sum_{i=1}^{8}(p_0 - p_i)\right],$$

$$= p_0 + \lambda \cdot \left[\sum_{i=1}^{8} \Delta p_i\right].$$

Two observations are noteworthy with regard to performing image sharpening via this unsharp mask algorithm:

(1) There are artifacts in an image that is sharpened using this unsharp mask. The algorithm is susceptible to noise, i.e., noise in an image will be increased. This deficiency may result in distortion and halos around sharp edges of objects in the image if the sharpening strength is high.

(2) The algorithm will enhance sharp edges, as well as noise, which are desired to be left as is and not be further sharpened.

In view of the above observations, the Applicants have realized that a different approach towards image sharpening is needed, which depends upon the strength of object edges, and which provides reduction of noise in an image. Also, it is desirable that an image sharpening function applies equal gain to all gradients, i.e., differences between pixels, in the image, thereby leading to intensity saturation of pixels to minimum and maximum values (e.g. 0 and 255 for 1 byte per channel).

The Applicants have further realized that there is a need for sharpening to operate as a gain function that increases with the increase in gradient and then ramps-down after a certain cut-off to avoid intensity saturation to minimum and maximum.

ϵ-Filter

The ϵ-filter is a known method to reduce image noise. It may be practiced according to the following equation:

$$p^{out} = p_0 + \sum_{i=1}^{8} w_i f(p_o - p_i), \qquad (3)$$

$$= p_0 + \sum_{i=1}^{8} w_i f(\Delta p_i),$$

$$= p_0 + \sum_{i=1}^{8} w_i f_i \Delta p_i.$$

where $p^{out}$ and $p_0$ are as defined above, $w_i$ are the weights in the range [0,1], $$f(x) = \begin{cases} \varepsilon, & x > \varepsilon \\ x, & |x| < \varepsilon \\ -\varepsilon, & x < -\varepsilon \end{cases}, \text{ and}$$

$$\sum w_i = 1.$$

This final condition on the weights, $\Sigma w_i=1$, ensures that the image intensity stays constant. If that is not a requirement for the particular image sharpening application, then that condition can be removed. It is also noted that the last step in equation set (3) is possible, because it is a discrete curve and $f_i$ can be adapted from $f$ such that the last step holds, i.e., is true. Because the pixel values are discrete, the function $f$ can be defined at each of the values as given in the equation above such that the two equations are mathematically equivalent. This is a key aspect of the invention.

In summary, the operation of this $\epsilon$-filter is clear: it suppresses any noise that is greater in amplitude than the threshold amplitude $\epsilon$ around the center pixel.

Combined Noise Suppression and Sharpening Filter

In accordance with the present disclosure, the Applicants' method of adaptive sharpening in image processing and display includes a combined noise suppression and sharpening filter. Attributes of this filter include, but are not limited to the following:

Suppression of noise present in the image, especially in the smooth regions (i.e., regions that do not include edges of objects) where artifacts are more perceptible (in a negative manner) to a human observer.

Prevention of intensity saturation to minimum and maximum. Typically, the minimum to maximum are 0 and 255 but could be any pre-defined range based on a given application.

Enhancement of object edges of that are low intensity, i.e., not clearly visible, thereby result in the best gain in image quality as perceived by a human observer.

No action (i.e., no enhancement of) very sharp edges, because processing such edges will only result in artifacts, and not an improvement of image quality.

In order to provide these attributes, it has been determined that the sharpening strength function must be dependent on the gradient calculated in the 3×3 (or larger) window (such as window 100 of FIG. 1) with respect to the center pixel. This may be accomplished by rewriting equation (2) to have the following form:

$$p^{out} = p_0 + \Sigma_{i=1}^{8} \lambda_i \Delta p_i. \quad (4)$$

A significant change to equation (2) is to move the sharpening strength parameter $\lambda$ to within the summation sign; in other words, $\lambda$ becomes $\lambda_i$ and is thus a variable dependent upon i instead of being a constant. Accordingly, $\lambda$ can be adapted to the strength of a gradient $\Delta p_i$.

Comparing equation (3) with equation (4), the Applicants have realized that for sharpening, it is not required to maintain the average intensity of an image since edges are enhanced, and furthermore, that functions $f_i$, and $\lambda_i$ can be combined into one function. For values under $\epsilon$, the combined function will be a noise reduction filter. For larger values it will act as a sharpening filter. Since the sharpening strength $\lambda$ has been made a variable $\lambda_i$ that is dependent upon the gradient strength, the behavior of the sharpening function is modified, so as to perform sharpening in an adaptive manner.

The combined filter is a rewriting of equation (4), with introduction of a new combined function, $c_i$.

$$p^{out} = p_0 + \Sigma_{i=1}^{8} c_i \Delta p_i. \quad (5)$$

It is noted that for an 8-bit input image, $c_i$ is a 511 point function.

An adaptive sharpening algorithm that includes equation (5) has the flexibility to operate under the assumption that smaller gradients in the filter window are due to the noise present in the image.

The modifications in the gradient gain function, or the gradient weight, i.e. the gain applied to the gradient are as follows:

As the details increase the gain is increased. However, increasing the gain function continuously may lead to saturation to the maximum value. This can be avoided by reducing the enhancement gain after some point. This region represents edges with low intensity. If the gain is, for example, 2.0 for input intensity 128 and gradient 64, then the gradient of output will saturate (128+2×64=256) and any higher value will saturate to 256. Therefore, the weights for any higher values can be reduced, all the way down to 0.

As the gradient or the edge intensity increases, the gain is reduced until finally it is reduced to zero for high intensity edges.

Figure 3:
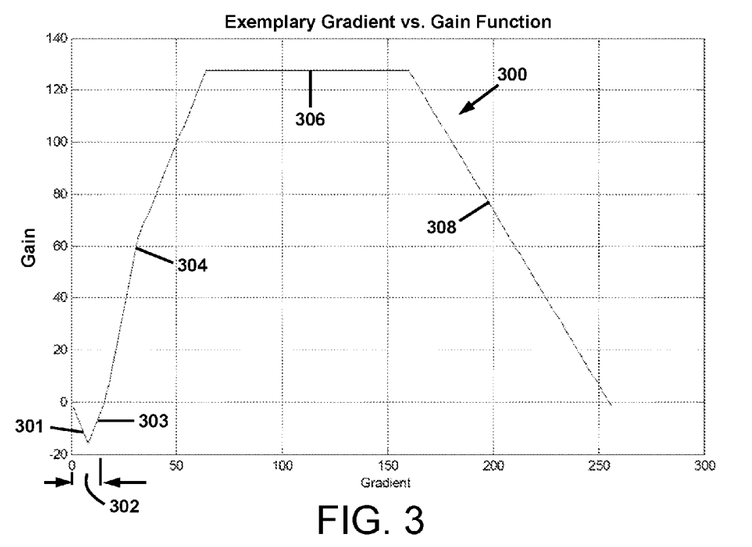
FIG. 3 depicts an first exemplary gradient versus gain function that may be used in a combined noise suppression and sharpening filter of the present disclosure.

For the purpose of illustration, FIG. 3 depicts a first exemplary gradient versus gain function 300. In this example, epsilon ($\epsilon$) has a chosen value of 8 and the maximum sharpness gain is chosen to be 2. It can be seen in FIG. 3 that the entire range of gradients from 0-255 (assuming 8 bits per pixel) is subdivided into five bands of gains as follows:

Region of negative gain 302: this is the smoothing region. The initial slope of portion 301 is "-x" and then portion 303 having a slope of "x."

Region 304 of high gain for gradients.

Flat gain region 306.

Decreasing gain region 308 for very (and increasingly) sharp edges.

Figure 4:
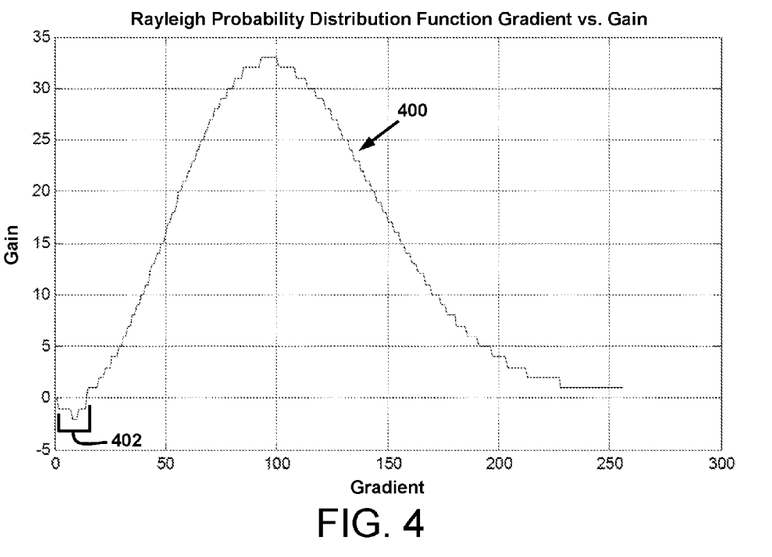
FIG. 4 depicts a second exemplary gradient versus gain function, which is a Rayleigh based distribution that may be used in the combined noise suppression and sharpening filter.

FIG. 4 depicts a second exemplary gain function 400. In this example, a Rayleigh based distribution, i.e., a continuous probability distribution, is used, and the table is then quantized. (It is noted that the use of Rayleigh distribution as a gain function is only one example or illustration of a gain function. The gain function may be could be any non-linear function that is operable to adaptively sharpen edges in an image that are perceived by a human observer to be of low intensity, while leaving edges in an image that are perceived by a human observer to be of high intensity substantially unchanged. It is further noted that in general, a Rayleigh distribution is a continuous function, so it needs to be discretized/quantized as shown in FIG. 4, for it to be able to be applicable to image pixel data.) A first region 402 of the function 400 has negative contribution, but the region 402 is very small. This example shows the ability of the Applicants' adaptive sharpening method to effect a tradeoff between smoothing and sharpening.

Other gain functions are contemplated including, but not limited to, a Weibull distribution function. The gain functions may be based on any other function that fulfills the sharpening gain requirements of the user as described above.

Computational Aspects

Certain additional features of the adaptive sharpening algorithm may be provided, which reduce the degree to which the algorithm is "computation intensive," thereby reducing image processing volume and speed requirements. Advantageously, in circumstances in which the computational power of a processor that executes the algorithm is low, the simplified algorithms described below are still executable by such a processor.

In executing the adaptive sharpening algorithm, in order to avoid the need for computation of gradients and their subsequent multiplication with the coefficients, a two dimensional look-up table (LUT) may be created in which each index or address of this LUT will store the product of the coefficient and the gradient with respect to the center pixel. Referring to FIG. 1, the first index/dimension of this LUT will be the center pixel $p_0$ and the second index/ dimension the LUT will be the neighboring pixel $p_1$. For accessing the product of $c_0*(p_0-p_1)$, the LUT will be indexed as LUT[$p_0$][$p_1$].

Assuming 8 bits per pixel, the total size of the above mentioned LUT will be 256×256=65536=64K.

If a further reduction in LUT size is desired, then the center pixel $p_0$ can be quantized to 6 bits. Thus the memory required will be reduced to 64×256=16384=16K. The Applicants have determined through experimentation that quantization of the center pixel does not cause any noticeable degradation in video quality.

It is further noted that the algorithm can work on only an individual Y, U, or V component of an image defined in the YUV color space, or H, S, of V component of an image in the HSV color space, or all three RGB components simultaneously. (It is further noted that applying sharpening to only the Y, U, or V component reduces the artifacts described previously herein.)

The pseudo code of the 2D adaptive sharpening algorithm for a single pixel, as described above, is presented as follows:

1. Load 9 pixels, the center pixel $p_0$ and the 3×3 pixel window.
2. For each pixel pair, get the product of the gradient and coefficient from the LUT:
   BaseLUT=LOAD($p_0$)
   Res0=LOAD(BASELUT+p1)
   Res1=LOAD(BASELUT+p2)
   Res2=LOAD(BASELUT+p3)
   Res3=LOAD(BASELUT+p4)
   Res5=LOAD(BASELUT+p5)
   Res6=LOAD(BASELUT+p6)
   Res7=LOAD(BASELUT+p7)
   Res8=LOAD(BASELUT+p8)
3. Compute the output as:
   Res9=p0+Res0
   Res10=Res9+Res1
   Res11=Res10+Res2
   Res12=Res11+Res3
   Res13=Res12+Res5
   Res14=Res13+Res6
   Res15=Res7+Res8
   Res16=Res14+Res15

Four-Gradient Approach

In order to increase image processing speed and/or reduce computational requirements of an image processor, in certain embodiments, the algorithm is further modified such that only four gradients are considered in the adaptive sharpening method instead of all eight gradients. More specifically, in one embodiment, the four corners values in the 3×3 mask are neglected. In this embodiment, equation (5) can be rewritten as follows:

$$p^{out}=p_0+\Sigma_{i=2,4,5,7}c_i\Delta p_i. \quad (6)$$

Accordingly, the above expression requires the computation of only four gradients. The number of additions to compute the output pixel is also halved.

The pseudo code of the Four-Gradient 2D adaptive sharpening algorithm for a single pixel is presented as follows:

1. Load all five pixels, i.e., the center pixel $p_0$, the two horizontal neighbors $p_4$ and $p_5$, and the two vertical neighbors $p_2$ and $p_7$ in a 3×3 pixel window. (See FIG. 1 for pixel locations.)
2. For each pixel pair get the product of the gradient and coefficient from the LUT:
   BaseLUT=LOAD($p_0$)
   Res0=LOAD(BASELUT+p2)
   Res1=LOAD(BASELUT+p4)
   Res2=LOAD(BASELUT+p5)
   Res3=LOAD(BASELUT+p7)
3. Compute the output as:
   Res4=$P_0$+Res0
   Res5=Res4+Res1
   Res6=Res2+Res3
   Res7=Res5+Res6

Further Simplifications For Software Porting

Further simplifications of the algorithm may be performed, and are applicable to a 3×3 window as shown in FIG. 1. The simplifications pertain to the gradient calculation and the use of a static look-up table as follows:

Gradient calculation: In the original algorithm, the gradients are computed with respect to the center pixel. To adopt a simpler approach, while performing a lesser number of gradient calculations, the gradients can be computed as $(p_2-p_7)$, $(p_4-p_5)$, $(p_1-p_8)$ and $(p_3-p_6)$, where $(p_2-p_7)$ and $(p_4-p_5)$ represent the vertical and horizontal edge pixels, respectively; and $(p_1-p_8)$ and $(p_3-p_6)$ represent the diagonal edges, all as depicted in FIG. 1.

Static LUT: Instead of computing filter coefficients in situ based on the gradients as derived in step 1 above, the static filter coefficient sets may be computed and stored in one or more look-up tables (LUTs). The filter sets are selected based on the combination of the horizontal and vertical gradients. The diagonal edges are always given a constant filter coefficient i.e. irrespective of the gradient; in other words, the ratio of contribution of the diagonal edges to the sharpening is fixed.

Multiple stored look-up tables may be provided for a variety of different purposes. In certain embodiments, the look-up tables may be defined based on the magnitude of the sum of input pixel differences, with smaller pixel difference increases for larger input pixel difference sums. Alternatively, they may be defined based on average values for the input neighbor pixels, thereby adjusting sharpening and noise reduction differently for dark and bright input image and video blocks. The look-up tables may be defined to process the input pixel differences with user selected levels of sharpness increase and/or user selected levels of noise decrease The values in the look-up tables, and the resulting table that is selected for image sharpening may be based upon the imaging application, the objects in the image to be displayed, and/or the type of display that is rendering the image. For example, the different look-up tables may be defined for different image or video data types including but not limited to games, movies, personal photos, military intelligence image or video data, medical modality image or video data, and commercial image or video data for exploration or industrial analysis. Additionally, for a given input image or sequence of images, different look-up tables may be chosen using additional information about the type of data in the image to be sharpened, including but not limited to information about whether the image includes faces or skin, text, graphics, uniform data, or structured/patterned data such as trees or grass. Additionally, the different look-up tables may be defined for different displays that are to render the image(s), including but not limited to televisions, computer monitors or computer screens, smartphones, tablets, and digital signs. Additionally, the different look-up tables may be defined based upon information about the importance of a particular image or image block to the user/viewer of the output image. The values in the look-up tables may be defined based upon a model of the human visual system region adaptation to image brightness.

It is further noted that one of the disadvantages of sharpening using the 3×3 window is that it can result in jagged edges that are too close to the horizontal or the vertical line or direction, i.e., a line or a column. This is due to the edge detection being limited to the maximum slope that can be detected using a 3×3 window. Also, for very large images and 4K video (i.e. video having a horizontal resolution on the order of 4000 pixels), the range of frequencies that such a window can accommodate may not be sufficient. A larger window may be necessary.

If an image processor is provided that has sufficient computational capability, then the window size may be increased to 5×5, or 3×5, or any other larger size. A 3×5 window may be more applicable to video images because more edges are along the horizontal direction. Accordingly, the algorithms disclosed herein are applicable to a 3×5 window, as will be apparent to one skilled in the art.

It is noted that the methods of the present invention may be performed by a device for sharpening an image comprising a processor in communication with a data input port for receiving input data of a digital image, and also in communication with a non-transitory computer readable medium that stores one or more of the adaptive sharpening algorithms described herein. The algorithms are communicable to and executable by the processor. The device may be further comprised of an image data receiver that is in communication with the processor, and that receives the output image pixel data defining output image pixels of the output image. In certain embodiments, the image data receiver may be a non-transitory computer readable medium, such as a memory, or a data storage disc, either of which may be portable, i.e., separable from the processor and transportable to interface with another computer or communications port or network. In other embodiments, the image data receiver may be an image display.

In certain embodiments, the device for sharpening and (optionally) noise reduction of an image may include a camera that captures still images or a sequence of images as a video or movie. In such embodiments, the sharpening and noise reduction of the images may be performed in real time using the device itself.

Alternatively, the methods may be performed in real time using a device that is separate from the device that is providing the digital input image. Such separate devices include but are not limited to a separate computer, tablet, or smartphone in the hardware and/or software thereof, in an image or video display, in an attached processor of images received via cable or wireless transmission, or in a central processing facility prior to image or video creation or reprocessing for improved libraries or distribution.

Additionally, it is noted that the resulting images (which have enhanced sharpness) produced by the methods of the present disclosure may be further processed to have enhanced contrast and/or enhanced brightness. Such further image processing may include the image processing using the Contrast methods as disclosed in the Applicant's commonly owned U.S. application Ser. No. 15/025,270, now U.S. Pat. No. 9,691,139, entitled "ADAPTIVE CONTRAST IN IMAGE PROCESSING AND DISPLAY," the disclosure of which is incorporated herein by reference.

It is, therefore, apparent that there has been provided, in accordance with the present invention, a method for sharpening of an image. Having thus described the basic concept of the invention, it will be rather apparent to those skilled in the art that the foregoing detailed disclosure is intended to be presented by way of example only, and is not limiting. Various alterations, improvements, and modifications will occur to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims.

I claim:

1. A method of sharpening an input image to produce an output image, the method comprising:
    a) providing the input image as a plurality of equal-sized digital input images comprised of input image pixels, each input image pixel defined by input image pixel data, the digital input images each comprising a matrix of input image pixels in 3 row×3-5 column format;
    b) identifying center pixels of the digital input image, the center pixels defined as those image pixels that are surrounded by upper and lower vertical pixels, left and right horizontal pixels, and upper left, upper right, lower left, and lower right diagonal pixels;
    c) for each of the center pixels, calculating at least four input gradients of intensity relative to the center pixel;
    d) defining a gradient minimum value, and a gradient maximum value;
    e) applying a gradient gain function to each of the input gradients of intensity for each of the center pixels to produce respective output gradients of intensity for each of the center pixels, wherein the gradient gain function is defined to adaptively vary the amount of gain such that object edges in the input image that are perceived by a human observer to be of low intensity are enhanced, and object edges in the input image that are perceived by a human observer to be sharp are left substantially unchanged;
    f) reducing the gradient gain function in response to output gradients of intensity exceeding a saturation value;
    g) for each of the center pixels, calculating output image pixel data based upon their output gradients of intensity, the output image pixel data defining output image pixels of the output image; and
    h) communicating the output image pixel data to an image data receiver.

2. The method of claim 1, wherein the gradient gain function is a linearly increasing function over a first low range of gradients, a constant over an intermediate range of gradients, and a linearly decreasing function over a high range of gradients.

3. The method of claim 2, wherein the gradient gain function includes a region of negative gain over a second low range of gradients that is less than the first low range of gradients.

4. The method of claim 1, wherein gradient gain function is a quantized Rayleigh distribution.

5. The method of claim 1, wherein the gradient gain function is defined using a one-dimensional look-up table containing a gain value corresponding to each gradient value.

6. The method of claim 1, wherein the gradient gain function is defined by the combination of an unsharp mask and a noise suppression filter.

7. The method of claim 6, wherein the unsharp mask operates to increase the intensity of edges of objects in the input image that are of low intensity, and the noise suppression filter operates to decrease the intensity of pixel values around the center pixel that are greater than a predetermined threshold amplitude value.

8. The method of claim 1, wherein the gradient gain function is further defined to adaptively suppress noise in regions of the input image that are perceived by a human observer to be smooth regions.

9. The method of claim 1, wherein the input image is a color image comprised of input image pixels defined by color tristimulus values.

10. The method of claim 9, wherein the color tristimulus values are RGB tristimulus values, and the method further comprises performing a color transformation to a color space selected from CieL*a*b*, CieLuv, CieIPT, and HSV.

11. The method of claim 9, wherein the color tristimulus values are RGB tristimulus values, and the method further comprises performing a color transformation to a color space having an image intensity component.

12. The method of claim 1, wherein the input image is a first input image and the output image is a first output image, and the method further comprises sharpening a plurality of additional input images defining a video to produce a plurality of additional output images defining a sharpened video.

13. The method of claim 1, wherein the calculating at least four input gradients of intensity relative to the center pixel is comprised of calculating respective input gradients of intensity from the center pixel to the left horizontal pixel, from the center pixel to the right horizontal pixel, from the center pixel to the upper vertical pixel, and from the center pixel to the lower vertical pixel.

14. The method of claim 1, wherein the calculating at least four input gradients of intensity relative to the center pixel is comprised of calculating respective input gradients of intensity from the upper vertical pixel to the lower vertical pixel, from the left horizontal pixel to the right horizontal pixel, from the upper left diagonal pixel to the lower right diagonal pixel, and from the lower left diagonal pixel to the upper right diagonal pixel, wherein each of the four input gradients comprises a difference between a pair of pixel intensity values.

15. The method of claim 1, wherein the calculating at least four input gradients of intensity relative to the center pixel is comprised of calculating respective input gradients of intensity from the center pixel to the left horizontal pixel, from the center pixel to the right horizontal pixel, from the center pixel to the upper vertical pixel, from the center pixel to the lower vertical pixel, from the center pixel to the upper left diagonal pixel, from the center pixel to the lower left diagonal pixel, from the center pixel to the upper right diagonal pixel, from the center pixel to the lower right diagonal pixel.

16. The method of claim 1, wherein the image data receiver is a display device and the method further comprises displaying the image on the display device.

17. A device for sharpening an image, the device comprising a processor in communication with a first non-transitory computer readable medium storing an algorithm communicable to and executable by the processor, and including the steps of:
  a) providing the input image as a plurality of equal-sized digital input images comprised of input image pixels, each input image pixel defined by input image pixel data, the digital input images each comprising a matrix of input image pixels in 3 row×3-5 column format;
  b) identifying center pixels of the image, the center pixels defined as those image pixels that are surrounded by upper and lower vertical pixels, left and right horizontal pixels, and upper left, upper right, lower left, and lower right diagonal pixels;
  c) for each of the center pixels, calculating at least four input gradients of intensity relative to the center pixel;
  d) defining a gradient minimum value, and a gradient maximum value;
  e) applying a gradient gain function to each of the input gradients of intensity for each of the center pixels to produce respective output gradients of intensity for each of the center pixels, wherein the gradient gain function is defined to adaptively vary the amount of gain such that object edges in the input image that are perceived by a human observer to be of low intensity are enhanced, and object edges in the input image that are perceived by a human observer to be sharp are left substantially unchanged;
  f) reducing the gradient gain function in response to output gradients of intensity exceeding a saturation value;
  g) for each of the center pixels, calculating output image pixel data based upon their output gradients of intensity, the output image pixel data defining output image pixels of the output image; and
  h) communicating the output image pixel data to an image data receiver.

18. The device of claim 17, further comprising the image data receiver.

19. The device of claim 18, wherein the image data receiver is an image display.

20. The device of claim 17, further comprising a data input port in communication with a source of the digital input image and in communication with the processor.

21. The device of claim 17, wherein the source of the digital input image is a second non-transitory computer readable medium.

* * * * *